US012768426B2

(12) United States Patent
Murakami et al.

(10) Patent No.: US 12,768,426 B2
(45) Date of Patent: Oct. 20, 2026

(54) LIQUID SEAL TYPE VIBRATION ISOLATION DEVICE, AND METHOD FOR MANUFACTURING LIQUID SEAL TYPE VIBRATION ISOLATION DEVICE

(71) Applicant: Toyo Tire Corporation, Itami (JP)

(72) Inventors: Tomohiro Murakami, Itami (JP); Tomoyuki Katamura, Itami (JP)

(73) Assignee: Toyo Tire Corporation, Itami (JP)

( * ) Notice: Subject to any disclaimer, the term of this patent is extended or adjusted under 35 U.S.C. 154(b) by 381 days.

(21) Appl. No.: 18/533,496

(22) Filed: Dec. 8, 2023

(65) Prior Publication Data

US 2024/0209915 A1 Jun. 27, 2024

(30) Foreign Application Priority Data

Dec. 27, 2022 (JP) ................................. 2022-210539

(51) Int. Cl.
*F16F 13/10* (2006.01)

(52) U.S. Cl.
CPC .......... *F16F 13/105* (2013.01); *F16F 13/103* (2013.01); *F16F 2224/025* (2013.01); *F16F 2226/04* (2013.01); *F16F 2230/30* (2013.01)

(58) Field of Classification Search
CPC .. F16F 13/105; F16F 13/103; F16F 2224/025; F16F 2226/04; F16F 2230/30
See application file for complete search history.

(56) References Cited

U.S. PATENT DOCUMENTS

| | | | | |
|---|---|---|---|---|
| 11,255,403 B2 * | 2/2022 | Sasaki | .................. | F16F 13/103 |
| 2016/0186831 A1 * | 6/2016 | Furusawa | ............ | B60K 5/1208 267/140.13 |
| 2019/0107171 A1 * | 4/2019 | Ueki | ..................... | F16F 13/107 |
| 2020/0191234 A1 * | 6/2020 | Sasaki | .................. | F16F 13/103 |
| 2020/0217392 A1 * | 7/2020 | Kojima | ................. | F16F 13/105 |
| 2022/0176793 A1 * | 6/2022 | Kojima | ................. | F16F 13/105 |

FOREIGN PATENT DOCUMENTS

JP 2013-231483 A 11/2013

* cited by examiner

*Primary Examiner* — Vishal R Sahni
(74) *Attorney, Agent, or Firm* — WHDA, LLP

(57) ABSTRACT

To provide a liquid seal type vibration isolation device to which a diaphragm can be appropriately assembled, and a method for manufacturing the liquid seal type vibration isolation device. Even if the annular member 16 is shifted in a radial direction, the contact portion 15*a* and the wall portions 23 are in contact with each other, to regulate an inclination of the annular member 16 to the partition 20. The diameter reduction processing is performed on the second fixture 12 in this state in which the inclination is regulated, whereby the diaphragm 15 (annular member 16) can be fixed on an inner circumference side of the second fixture 12 at an appropriate angle.

9 Claims, 5 Drawing Sheets

LIQUID SEAL TYPE VIBRATION ISOLATION DEVICE, AND METHOD FOR MANUFACTURING LIQUID SEAL TYPE VIBRATION ISOLATION DEVICE

TECHNICAL FIELD

The present invention relates to a liquid seal type vibration isolation device and a method for manufacturing the liquid seal type vibration isolation device, and in particular, the liquid seal type vibration isolation device to which a diaphragm can be appropriately assembled and the method for manufacturing such a liquid seal type vibration isolation device.

BACKGROUND ART

As a vibration isolation device which supports a vibration source such as an engine for a vehicle body, a liquid seal type vibration isolation device disclosed in Japanese Patent Application Laid-Open (kokai) No. 2013-231483 (e.g., paragraphs 0021 to 0025, and FIG. 1) has been known, for example. This liquid seal type vibration isolation device includes a first member (first mounting member 1) to be mounted to a vibration source side, a tubular second member (second mounting member 2) to be mounted on the vehicle body side, and a vibration-isolating base body (rubber base body 3) connecting the first member and the second member. A liquid chamber (liquid sealed chamber 5) is formed between a diaphragm mounted to the second member and the vibration-isolating base body, and the liquid chamber is partitioned into a first liquid chamber and a second liquid chamber by a partition (partition member 6).

A circular ring-shaped annular member is fixed (adhered) to an outer edge of the diaphragm. Although the annular member described in Japanese Patent Application Laid-Open (kokai) No. 2013-231483 has a thickness in a radial direction thicker than that in an axial direction, it is preferable that a large inner diameter of the annular member is ensured by forming the thickness in the radial direction of the annular member to be thin, in order to improve the durability of the diaphragm. The reason for this is because, when the inner diameter of the annular member is enlarged, a free length of the diaphragm can be enlarged by an amount equivalent to the enlarged inner diameter.

SUMMARY OF THE INVENTION

Problems to be Solved by the Invention

However, when the inner diameter of the annular member is enlarged, it may be difficult to appropriately assemble the diaphragm in some cases. This problem will be described with reference to FIG. 4 and FIG. 5. FIG. 4 is a cross-sectional view of a liquid seal type vibration isolation device 210 as a reference example, and FIG. 5 is a perspective view of a partition 20. FIG. 4 illustrates a state in which an opening of a second fixture 12 (second member), on which diameter reduction processing has not been performed, is directed upward. In addition, the liquid seal type vibration isolation device 210 shown in FIG. 4 has the same configuration as a liquid seal type vibration isolation device 10 (shown in FIG. 1) described below, except that the configuration of a diaphragm 215 is different.

As shown in FIG. 4, when the diaphragm 215 is assembled to the liquid seal type vibration isolation device 210, in a state in which an annular member 16 is stacked on the partition 20 set on an inner circumference side of the tubular second fixture 12, the diameter reduction processing is performed on the second fixture 12. At this time, when the axial center of the annular member 16 coincides with the axial center of the partition 20 (the annular member 16 is concentric with the partition 20), that is, when the annular member 16 is stacked properly on the partition 20, it is difficult for the annular member 16 to be inclined to the partition 20.

However, if the annular member 16 is shifted to a position beyond an outer edge of the partition 20 in a radial direction, the annular member 16 is inclined so as to enter between the second fixture 12 and the partition 20. Such an inclination of the annular member 16 easily occurs when a plurality of wall portions 23 are formed on the outer edge of the partition 20 as shown in FIG. 5. It is noted that a structure in which the annular member 16 having the enlarged inner diameter is stacked on the partition 20 having the plurality of wall portions 23 (configuration shown in FIG. 4), is not known at the time of filing the present application.

As shown in FIG. 5, the partition 20 includes a tube portion 21 having a cylindrical shape, an extending portion 22 extending in a flange shape (radially outward) from an axial end portion (end portion on a lower side in FIG. 5) of the tube portion 21, and the rib-shaped wall portions 23 projecting from the extending portion 22 and the tube portion 21. The components 21 to 23 are formed integrally using metal or synthetic resin.

In the example shown in FIG. 5, twelve wall portions 23 are arranged along the circumferential direction, and the plurality of wall portions 23 are each formed in a plate shape such that a plate thickness direction thereof is directed in the circumferential direction. Since the plurality of wall portions 23 arranged in the circumferential direction in this manner are formed on the outer edge of the partition 20, when the annular member 16 is stacked on the partition 20 (wall portions 23), a contact portion (portion that serves to regulate the inclination of the annular member 16) between the partition 20 and the annular member 16 decreases.

As shown in FIG. 4, when the annular member 16 is shifted to a position beyond the wall portions 23 in the radial direction, the annular member 16 is easily inclined to the partition 20. Further, in a case where the inner diameter of the annular member 16 is enlarged (thickness is reduced in the radial direction), even if a positional shift of the annular member 16 in the radial direction is slight, the annular member 16 enters between the second fixture 12 and the partition 20 beyond the wall portions 23, so that the annular member 16 is easily inclined. There is a problem that the diaphragm 215 cannot be appropriately assembled, if the diameter reduction processing is performed on the second fixture 12 in a state in which the annular member 16 is inclined.

The present invention has been made to solve the above-described problem, and an object of the present invention is to provide a liquid seal type vibration isolation device to which a diaphragm can be appropriately assembled, and a method for manufacturing the liquid seal type vibration isolation device.

Means for Solving the Problems

In order to achieve this object, a liquid seal type vibration isolation device of the present invention includes: a first member and a tubular second member; a vibration-isolating base body which is made of a rubbery elastic body and connects the first member and the second member; a diaphragm which forms a liquid chamber, in which liquid is sealed, between the diaphragm and the vibration-isolating base body; an annular member, is fixed to an outer edge of the diaphragm, and is held on an inner circumference side of the second member; and a partition which partitions the liquid chamber into a first liquid chamber on the vibration-isolating base body side and a second liquid chamber on the diaphragm side. The partition is formed in a plate shape extending in a radial direction, and includes, on an outer edge of the partition, a plurality of wall portions arranged in a circumferential direction. The annular member is formed to have a thickness in the radial direction thinner than that in the axial direction. The diaphragm includes a contact portion, and the contact portion comes into contact with the wall portions on an inner circumference side of the annular member, to regulate an inclination of the annular member to the partition.

In a method for manufacturing a liquid seal type vibration isolation device of the present invention, the liquid seal type vibration isolation device includes: a first member and a tubular second member; a vibration-isolating base body which is made of a rubbery elastic body and connects the first member and the second member; a diaphragm which forms a liquid chamber, in which liquid is sealed, between the diaphragm and the vibration-isolating base body; an annular member, is fixed to an outer edge of the diaphragm, and is held on an inner circumference side of the second member; and a partition which partitions the liquid chamber into a first liquid chamber on the vibration-isolating base body side and a second liquid chamber on the diaphragm side, the partition is formed in a plate shape extending in a radial direction, and includes, on an outer edge of the partition, a plurality of wall portions arranged in a circumferential direction, the annular member is formed to have a thickness in the radial direction thinner than that in the axial direction, and the diaphragm includes a contact portion formed on an inner circumference side of the annular member. The method includes: a first step of stacking the annular member on the plurality of wall portions; and a second step of reducing a diameter of the second member after the first step. In the first step, if the annular member is shifted in the radial direction until the annular member comes into contact with an inner circumferential surface of the second member the diameter of which has not been reduced, the contact portion is brought into contact with axial end surfaces of the wall portions, to regulate an inclination of the annular member to the partition.

Advantageous Effects of the Invention

The liquid seal type vibration isolation device according to a first aspect exhibits the following effects. The diaphragm includes the contact portion which comes into contact with the wall portions on the inner circumference side of the annular member, and thus, even if the annular member is shifted in the radial direction in a state in which the diameter reduction processing has not been performed on the second member, the wall portions and the contact portion are in contact with each other, to regulate the inclination of the annular member to the partition. That is, even if the partition includes the plurality of plate-shaped wall portions arranged in the circumferential direction and the thickness in the radial direction of the annular member is formed thin, the diaphragm can be appropriately assembled.

The liquid seal type vibration isolation device according to a second aspect exhibits the following effects, in addition to the effects exhibited by the liquid seal type vibration isolation device of the first aspect. The contact portion is formed continuously in the circumferential direction, and thus the contact portion can be brought into contact with the plurality of wall portions without performing positioning of the annular member in the circumferential direction. Thus, the workability of assembling work of the diaphragm is improved.

The liquid seal type vibration isolation device according to a third aspect exhibits the following effects, in addition to the effects exhibited by the liquid seal type vibration isolation device of the first aspect. The contact portion is a protrusion protruding to the partition side relative to an axial end surface of the annular member, and thus the contact portion which is a rubbery elastic body can be brought into contact with the wall portions when the annular member is stacked on the partition. Accordingly, it is difficult for the annular member to be shifted (hard to slip) in the radial direction on the partition, and the diaphragm can be appropriately assembled.

The liquid seal type vibration isolation device according to a fourth aspect exhibits the following effects, in addition to the effects exhibited by the liquid seal type vibration isolation device of the third aspect. The diaphragm includes a groove-shaped recess which is formed between the annular member and the contact portion and is continuous in the circumferential direction. Accordingly, when a molded product including the diaphragm and the annular member is vulcanized, the inner circumference side of the annular member can be sealed with a protrusion of a mold for forming a recess of the diaphragm. Thus, a rubber material can be inhibited from entering between the axial end surface of the annular member and the mold.

The liquid seal type vibration isolation device according to a fifth aspect exhibits the following effects, in addition to the effects exhibited by the liquid seal type vibration isolation device of the fourth aspect. The groove-shaped recess continuous in the circumferential direction is formed between the annular member and the contact portion, and thus, when the contact portion is pressed onto the wall portions by caulking an axial end portion of the second member to the inner circumference side, part of deformation of the contact portion can be received by the recess. Accordingly, stress can be inhibited from being concentrated in a joint portion between the diaphragm and the annular member, and thus the durability of the diaphragm can be improved.

The liquid seal type vibration isolation device according to a sixth aspect exhibits the following effects, in addition to the effects exhibited by the liquid seal type vibration isolation device of the fifth aspect. When viewed from a cross section including an axis of the annular member, the contact portion is formed in an arc shape protruding to the wall portions side, and the recess is formed in an arc shape recessed in a direction away from the wall portions while being continuous with an outer edge of the contact portion. Accordingly, when the contact portion is pressed onto the wall portions by caulking the axial end portion of the second member to the inner circumference side, stress can be inhibited from being concentrated in a part of a protruding and recessed part composed of the contact portion and the recess. Thus, the durability of the diaphragm can be improved.

The liquid seal type vibration isolation device according to a seventh aspect exhibits the following effects, in addition to the effects exhibited by the liquid seal type vibration isolation device of the fifth aspect. The dimension of a portion, protruding relative to the axial end surface of the annular member, of the contact portion is not more than 10% of the dimension in the axial direction of the annular member. Accordingly, when the contact portion is pressed onto the wall portions by caulking the axial end portion of the second member to the inner circumference side, the amount of deformation of the contact portion can made small. Thus, stress can be inhibited from being concentrated in the joint portion between the diaphragm and the annular member, and thus the durability of the diaphragm can be improved.

The liquid seal type vibration isolation device according to an eighth aspect exhibits the following effects, in addition to the effects exhibited by the liquid seal type vibration isolation device of the first aspect. Even if the wall portions are arranged at unequal intervals in the circumferential direction of the partition, the wall portions and the contact portion are in contact with each other, to regulate the inclination of the annular member to the partition. Therefore, the diaphragm can be appropriately assembled.

According to the method for manufacturing the liquid seal type vibration isolation device of a ninth aspect, the following effects are exhibited. The method includes the first step of stacking the annular member on the plurality of wall portions, and the second step of reducing the diameter of the second member after the first step. In the first step, even if the annular member is shifted in the radial direction until the annular member comes into contact with the inner circumferential surface of the second member the diameter of which has not been reduced, the contact portion is in contact with the axial end surfaces of the wall portions, to regulate the inclination of the annular member to the partition through such contact. That is, even if the partition includes the plurality of plate-shaped wall portions arranged in the circumferential direction, and the thickness in the radial direction of the annular member is formed thin, the diaphragm can be appropriately assembled.

MODES FOR CARRYING OUT THE INVENTION

Figure 1:
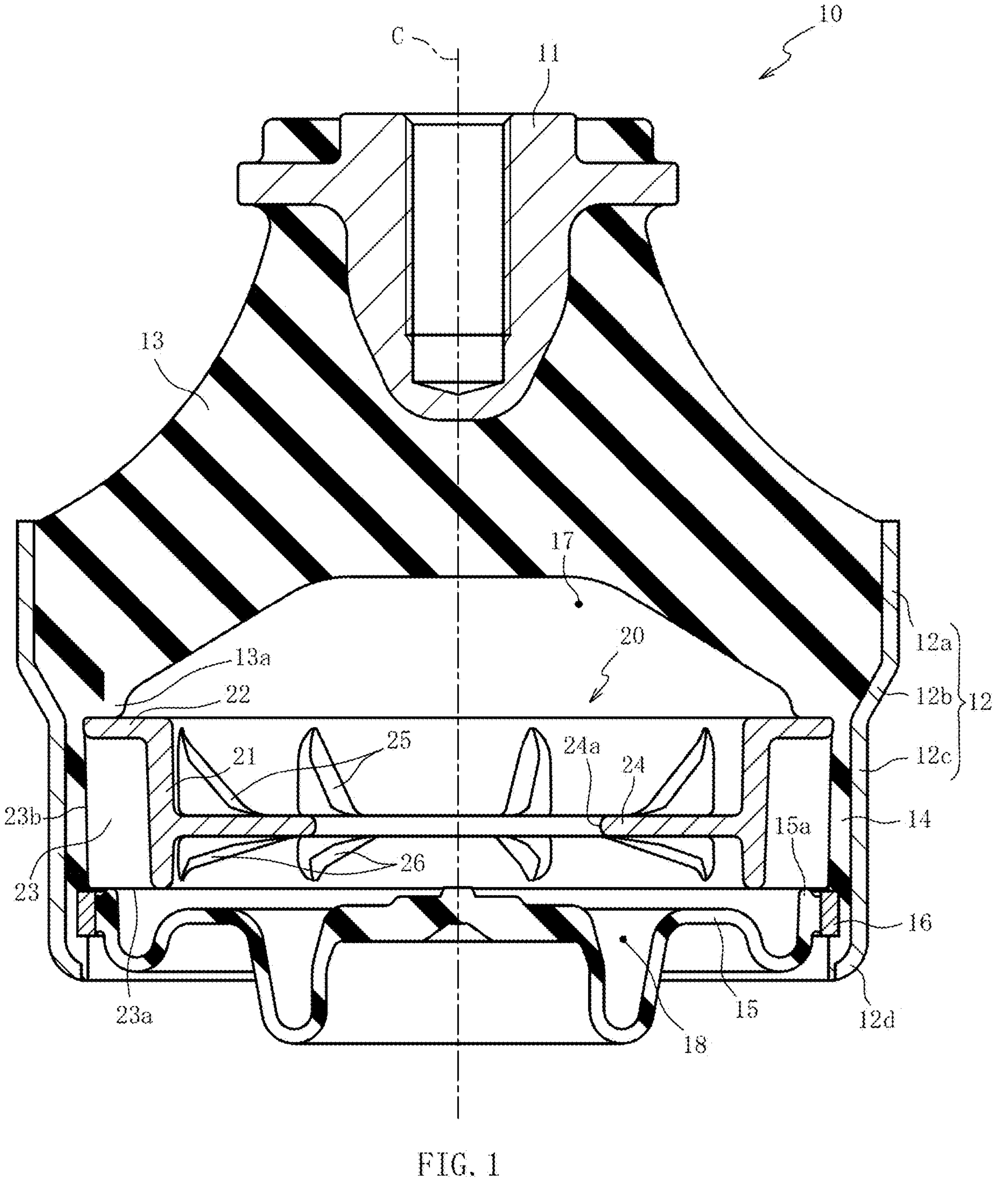
FIG. 1 Cross-sectional view of a liquid seal type vibration isolation device according to one embodiment of the present invention.

Hereinafter, a preferred embodiment of the present invention will be described with reference to the accompanying drawings. FIG. 1 is a cross-sectional view of a liquid seal type vibration isolation device 10 according to an embodiment of the present invention. FIG. 1 illustrates a state in which an engine has not been supported by the liquid seal type vibration isolation device 10 (i.e., a state in which the weight of the engine has not been added), that is, a stationary state in which vibration has not been inputted to the liquid seal type vibration isolation device 10. The cross-sectional view of the liquid seal type vibration isolation device 10 in FIG. 1 is also an axial cross-sectional view including an axial center C of a tubular second fixture 12.

In the following description, one side (upper side in FIG. 1) and the other side (lower side in FIG. 1) in an axial direction of the second fixture 12 are respectively referred to as an upper side and a lower side of the liquid seal type vibration isolation device 10, for example. However, the up-down direction of the liquid seal type vibration isolation device 10 does not necessarily correspond to that of a vehicle to which the liquid seal type vibration isolation device 10 is mounted.

The liquid seal type vibration isolation device 10 is an engine mount for elastically supporting an engine of an automobile. The liquid seal type vibration isolation device 10 includes a first fixture 11 to be mounted on the engine (not shown; a vibration source) side, the tubular second fixture 12 to be mounted to a vehicle body (not shown) which is a support side, and a vibration-isolating base body 13 for connecting the first fixture 11 and the second fixture 12.

The first fixture 11 is a metal flange disposed on the axial center C of the second fixture 12 so as to be located above the second fixture 12, and is formed of metal such as steel or an aluminum alloy. A bolt hole is formed in an upper end surface of the first fixture 11, and the first fixture 11 is mounted, on the engine side, with a bolt (not shown) inserted in the bolt hole.

The second fixture 12 is formed in a cylindrical shape using metal such as steel. The second fixture 12 includes a large-diameter portion 12*a* on an upper end side, a reducing diameter portion 12*b* continuous with a lower end of the large-diameter portion 12*a* and having an inside diameter and an outside diameter which gradually decrease as advancing downward, and a small-diameter portion 12*c* continuous with a lower end of the reducing diameter portion 12*b* and having inside and outside diameters smaller than those of the large-diameter portion 12*a*. The second fixture 12 is mounted to a vehicle body side by fitting the large-diameter portion 12*a* into a tubular bracket provided on the vehicle body side.

The vibration-isolating base body 13 is formed in an approximately umbrella shape using an elastic body such as rubber or thermoplastic elastomer. The vibration-isolating base body 13 is vulcanized and adhered to a lower part of the first fixture 11, and inner circumferential surfaces of the large-diameter portion 12*a* and the reducing diameter portion 12*b*, whereby the first fixture 11, and the large-diameter portion 12*a* and the reducing diameter portion 12*b* are connected. A seal wall portion 14 having a rubber film shape is continuous with a lower end portion of the vibration-isolating base body 13, and the seal wall portion 14 covers the entire circumference of an inner circumferential surface of the small-diameter portion 12*c*. The seal wall portion 14 is part of the second fixture 12.

A diaphragm 15 which closes an opening part on a lower end side of the small-diameter portion 12*c*, is mounted to the second fixture 12 via an annular member 16. The diaphragm 15 is a membrane made of an elastic body such as rubber. The annular member 16 is formed in a circular ring shape using metal such as steel, and an outer edge of the diaphragm 15 is vulcanized and adhered to the entire circumference of an inner circumferential surface of the annular member 16.

A liquid chamber is formed as a sealed space defined by the vibration-isolating base body 13, the second fixture 12, and the diaphragm 15. A nonfreezing liquid (not shown) such as ethylene glycol is sealed in the liquid chamber. The liquid chamber is partitioned by a partition 20, into a first liquid chamber 17 having a chamber wall which is partially formed by the vibration-isolating base body 13, and a second liquid chamber 18 having a chamber wall which is partially formed by the diaphragm 15.

Figure 5:
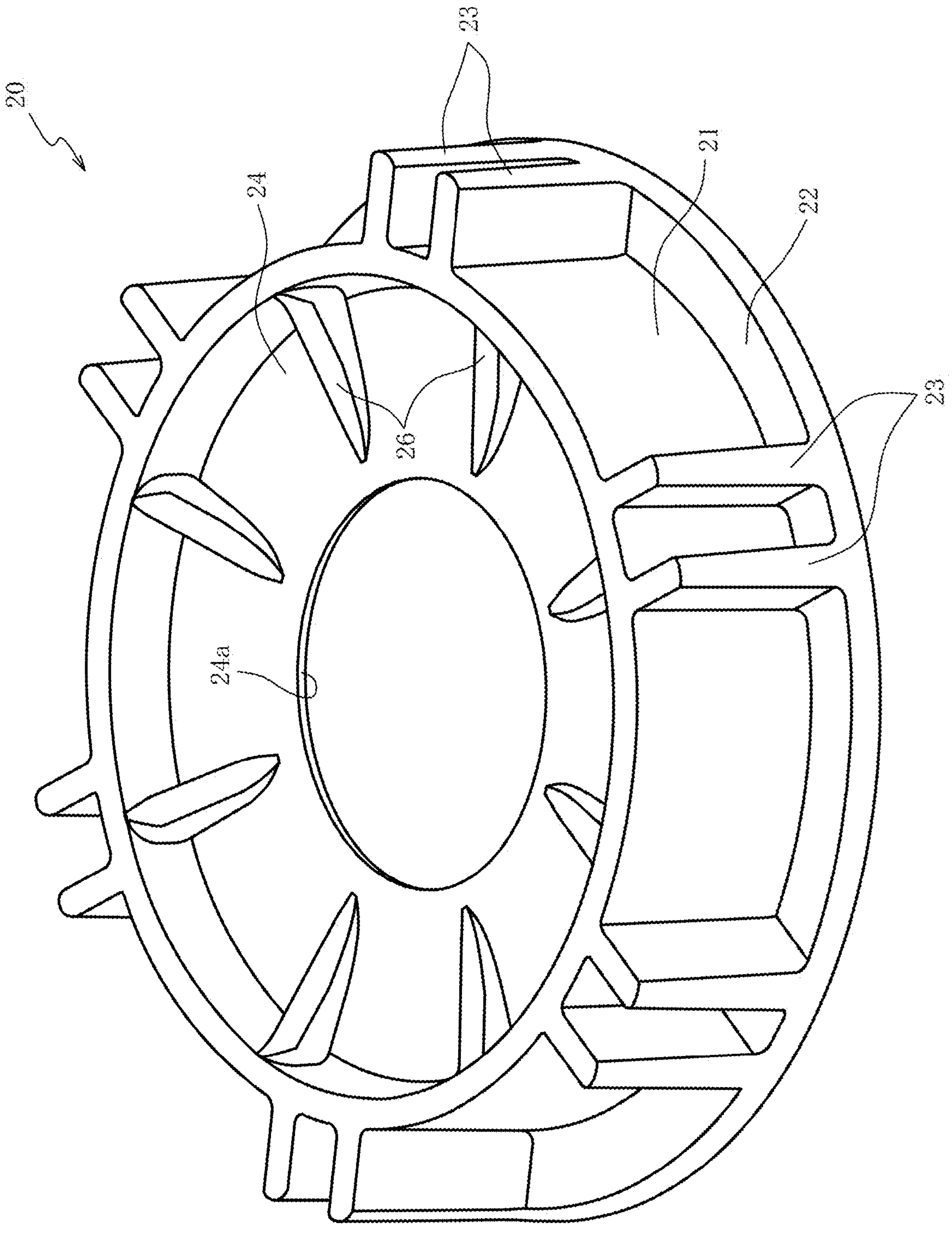
FIG. 5 Perspective view of a partition.

The partition 20 shown in FIG. 1 has the same configuration as the partition 20 shown in FIG. 5, and includes a tube portion 21, an extending portion 22, and wall portions 23. An upper surface of the extending portion 22 is in contact with a step 13*a*, which extends from an upper end of the seal wall portion 14 inward in the radial direction so as to have a step-shape, of the vibration-isolating base body 13, and an outer circumference surface of the partition 20 is pressed via the seal wall portion 14 onto the entire circumference of an inner circumferential surface of the second fixture 12.

End edges 23*a* (lower edges) in the axial direction of the wall portions 23 are formed so as to linearly extend from a lower edge of the tube portion 21 in the radial direction, and outer circumference edges 23*b* of the wall portions 23 are formed so as to linearly extend from an outer circumference edge of the extending portion 22 in the axial direction. That is, each wall portion 23 is formed in a rectangular plate shape connecting an outer circumference surface of the tube portion 21 and a lower surface of the extending portion 22.

A plurality of the wall portions 23 (twelve wall portions 23 in the present embodiment) are arranged along the circumferential direction. In the partition 20, a region where an interval between the wall portions 23 is relatively narrow and a region where an interval between the wall portions 23 is relatively wide are formed alternately in the circumferential direction (see FIG. 5). That is, in the present embodiment, the plurality of wall portions 23 are arranged at unequal intervals in the circumferential direction, but the wall portions 23 may be arranged at equal intervals in the circumferential direction.

The partition 20 includes a disk-shaped partition part 24 connected to an inner circumferential surface of the tube portion 21, and upper-side rib parts 25 and lower-side rib parts 26 respectively formed on an upper surface and a lower surface of the partition part 24. The components 24 to 26 are formed integrally with the tube portion 21.

A circular opening 24*a* is formed at the center of the partition part 24. Each upper-side rib part 25 is formed in a wall shape inclined downward toward the opening 24*a* from an upper end part of the inner circumferential surface of the tube portion 21, and each lower-side rib part 26 is formed in a wall shape inclined upward toward the opening 24*a* from a lower end part of the inner circumferential surface of the tube portion 21.

A plurality of the upper-side rib parts 25 and a plurality of the lower-side rib parts 26 are arranged (eight upper-side rib parts 25 and eight lower-side rib parts 26 are radially arranged, in the present embodiment) in the circumferential direction, and the plurality of upper-side rib parts 25 and the plurality of lower-side rib parts 26 are disposed in positions vertically overlapping each other.

Figure 2A:
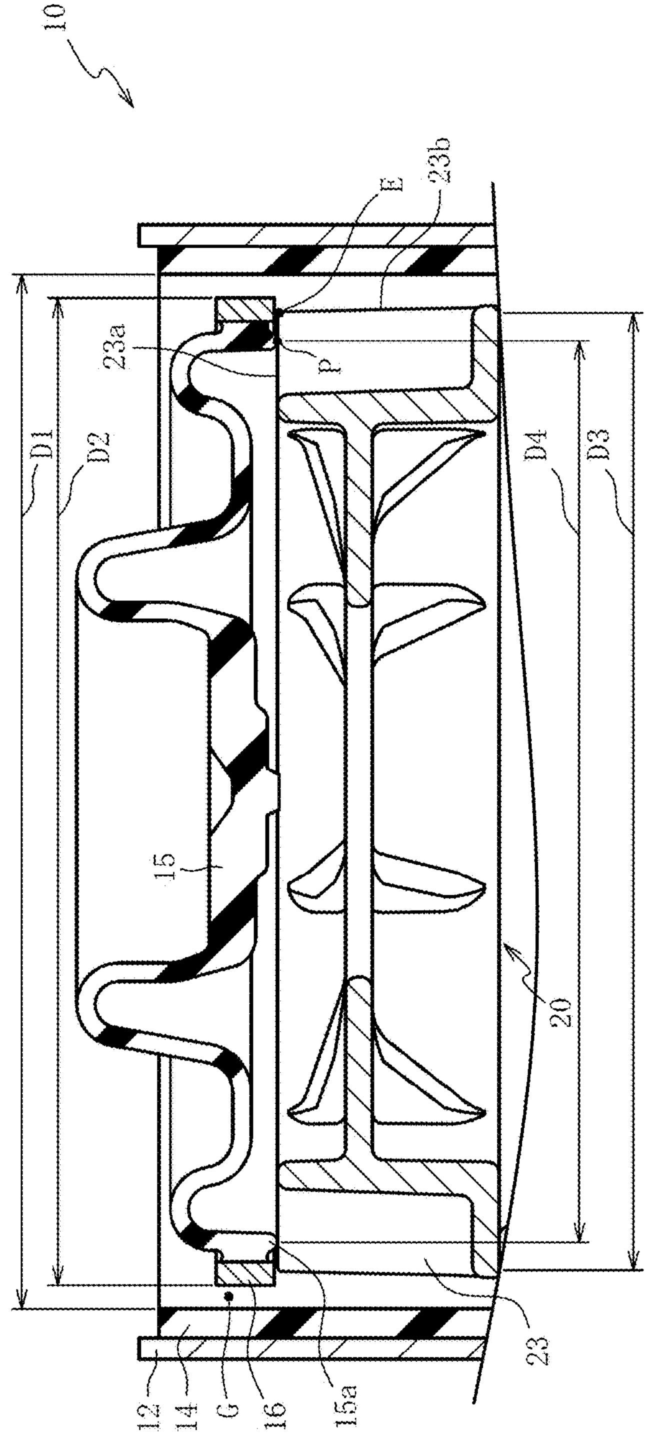
FIG. 2A Cross-sectional view of the liquid seal type vibration isolation device in which diameter reduction processing has not been performed on a second fixture.
Figure 2B:
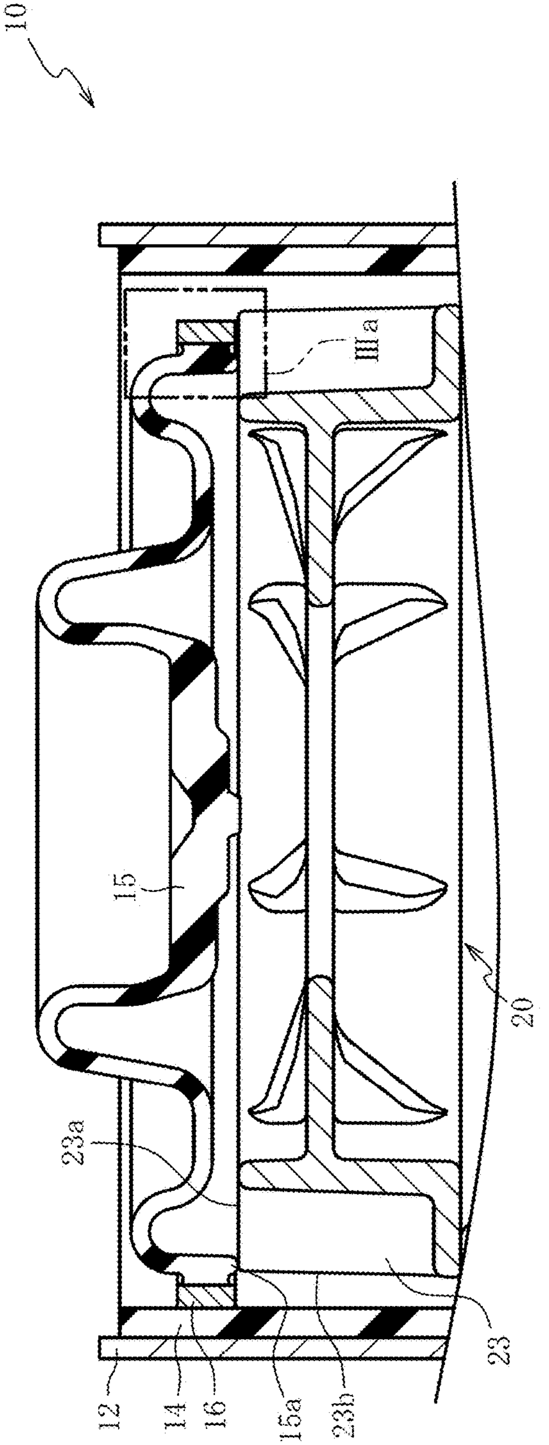
FIG. 2B Cross-sectional view of the liquid seal type vibration isolation device in which an annular member is shifted in the radial direction from the state of FIG. 2A.

The partition 20 and the diaphragm 15 (annular member 16) are held on an inner circumference side of the seal wall portion 14 through diameter reduction processing performed on the second fixture 12. The diameter reduction processing will be described with reference to FIGS. 2A and 2B. FIG. 2A is a cross-sectional view of the liquid seal type vibration isolation device 10 in which the diameter reduction processing has not been performed on the second fixture 12, and FIG. 2B is a cross-sectional view of the liquid seal type vibration isolation device 10 in which the annular member 16 is shifted in the radial direction from the state of FIG. 2A. FIGS. 2A and 2B each illustrate a state in which an opening of the second fixture 12, on which the diameter reduction processing has not been performed, is directed upward.

As shown in FIGS. 2A and 2B, when the diaphragm 15 is assembled to the liquid seal type vibration isolation device 10, first, the partition 20 is set on an inner circumference side of the second fixture 12 the diameter of which has not been reduced, and the annular member 16 is stacked on an axial end surface (upper surface in FIGS. 2A and 2B) of the partition 20 (first step). The diameter of the second fixture 12 is reduced in a state in which the annular member 16 is stacked on the partition 20 (second step), whereby the diaphragm 15 is assembled on the inner circumference side of the second fixture 12 (see FIG. 1).

In a state in which the diameter reduction processing has not been performed on the second fixture 12, an inner diameter D1 of the second fixture 12 (seal wall portion 14) is larger than an outer diameter D2 of the annular member 16 and an outer diameter D3 of the partition 20. Assuming that an intersection point between the end edge 23*a* and the outer circumference edge 23*b* of each wall portion 23 is an outer edge E of the wall portion 23, the outer diameter D3 of the partition 20 is a diameter of a circle including the outer edges E of the plurality of wall portions 23.

When the annular member 16 is disposed on a fixed position in which the axial center of the partition 20 and the axial center of the annular member 16 coincide with each other in a state in which the diameter of the second fixture 12 has not been reduced (hereinafter, simply referred to as "fixed position"), a gap G having a size of "(D1−D2)/2" is generated between an outer circumference surface of the annular member 16 and the inner circumferential surface of the second fixture 12 (seal wall portion 14). Thus, if the annular member 16 is shifted in the radial direction from the fixed position until the annular member 16 comes into contact with the second fixture 12 (seal wall portion 14), the annular member 16 is displaced by a distance "(D1−D2)/2" at most. In the present embodiment, even if the annular member 16 is displaced in such a manner, the annular member 16 is configured such that a contact portion 15*a* of the diaphragm 15 is in contact with the end edges 23*a* of the wall portions 23.

The contact portion 15*a* is a protrusion protruding to the partition 20 side relative to the annular member 16. The contact portion 15*a* is formed in an annular shape continuous in the circumferential direction, and a diameter of a circle including an apex P (inner edge in a portion in contact with the wall portions 23) of the contact portion 15*a* is denoted by D4. When the annular member 16 is disposed in the fixed position, a distance from the apex P of the contact portion 15*a* to the outer edge E of each wall portion 23 is represented by "(D3−D4)/2", and this distance is larger than the gap G between the annular member 16, and the second fixture 12 (seal wall portion 14) the diameter of which has not been reduced ("D1−D2<D3−D4" is satisfied).

Accordingly, even if the annular member 16 is shifted in the radial direction until the annular member 16 comes into contact with the inner circumferential surface of the second fixture 12 (seal wall portion 14) the diameter of which has not been reduced (see FIG. 2B), the contact portion 15*a* can be maintained to be in contact with the end edges 23*a* of the wall portions 23. The contact portion 15*a* and the end edges 23*a* of the wall portions 23 are in contact with each other, to regulate the inclination of the annular member 16 to the partition 20. Therefore, the diameter reduction processing is performed on the second fixture 12 in the state in which the inclination is regulated, whereby the diaphragm 15 (annular member 16) can be fixed on the inner circumference side of the second fixture 12 at an appropriate angle. That is, even if the partition 20 includes the plurality of plate-shaped wall portions 23 arranged in the circumferential direction and the thickness in the radial direction of the annular member 16 is formed thin as in the present embodiment, the diaphragm 15 can be appropriately assembled.

When the inclination of the annular member 16 to the partition 20 is regulated with the contact portion 15*a* as described above, a configuration in which the contact portion 15*a* is formed intermittently in the circumferential direction may also be used, for example. However, in such a configuration, positioning of the annular member 16 in the circumferential direction needs to be performed such that the contact portion 15*a* comes into contact with the plurality of wall portions 23.

On the other hand, in the present embodiment, since the contact portion 15*a* is formed in an annular shape continuous in the circumferential direction, the contact portion 15*a* can be brought into contact with the plurality of wall portions 23 without performing positioning of the annular member 16 in the circumferential direction. Thus, the workability of assembling work for the diaphragm 15 is improved.

In addition, as long as the diaphragm 15 can be appropriately assembled, a configuration in which the contact portion 15*a* does not protrude relative to an axial end surface (lower surface in FIGS. 2A and 2B) of the annular member 16 may be used. However, in such a configuration, the annular member 16 made of metal, not the contact portion 15*a* made of rubber, comes into contact with the partition 20, and thus the annular member 16 is easily shifted in the radial direction (e.g., slippage is easily caused when metals are in contact with each other).

On the other hand, since the contact portion 15*a* of the present embodiment is a protrusion protruding to the partition 20 (wall portions 23) side relative to the axial end surface of the annular member 16, the contact portion 15*a*, not the annular member 16, can be brought into contact with the wall portions 23, when the annular member 16 is stacked on the partition 20. Since the contact portion 15*a* made of rubber is brought into contact with the wall portions 23 (partition 20), it is difficult for the annular member 16 to be shifted (hard to slip) in the radial direction on the partition 20, and thus the diaphragm 15 can be appropriately assembled.

Figure 3B:
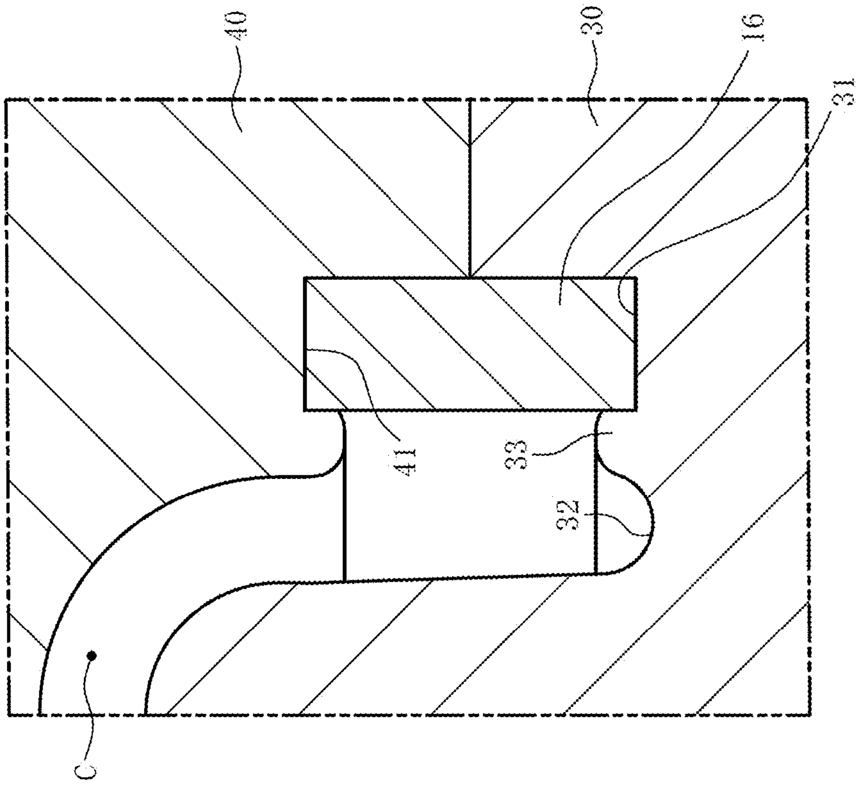
FIG. 3B Partially enlarged cross-cross-sectional view of a lower mold and an upper mold for vulcanizing the diaphragm.
Figure 3A:
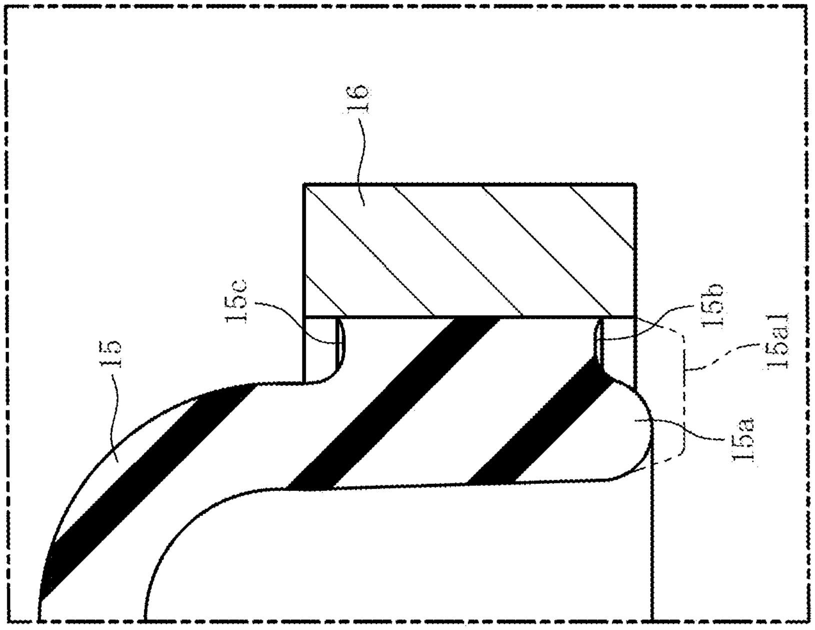
FIG. 3A Partially enlarged cross-sectional view of a diaphragm and the annular member in a IIIa portion in FIG. 2B.
Figure 4:
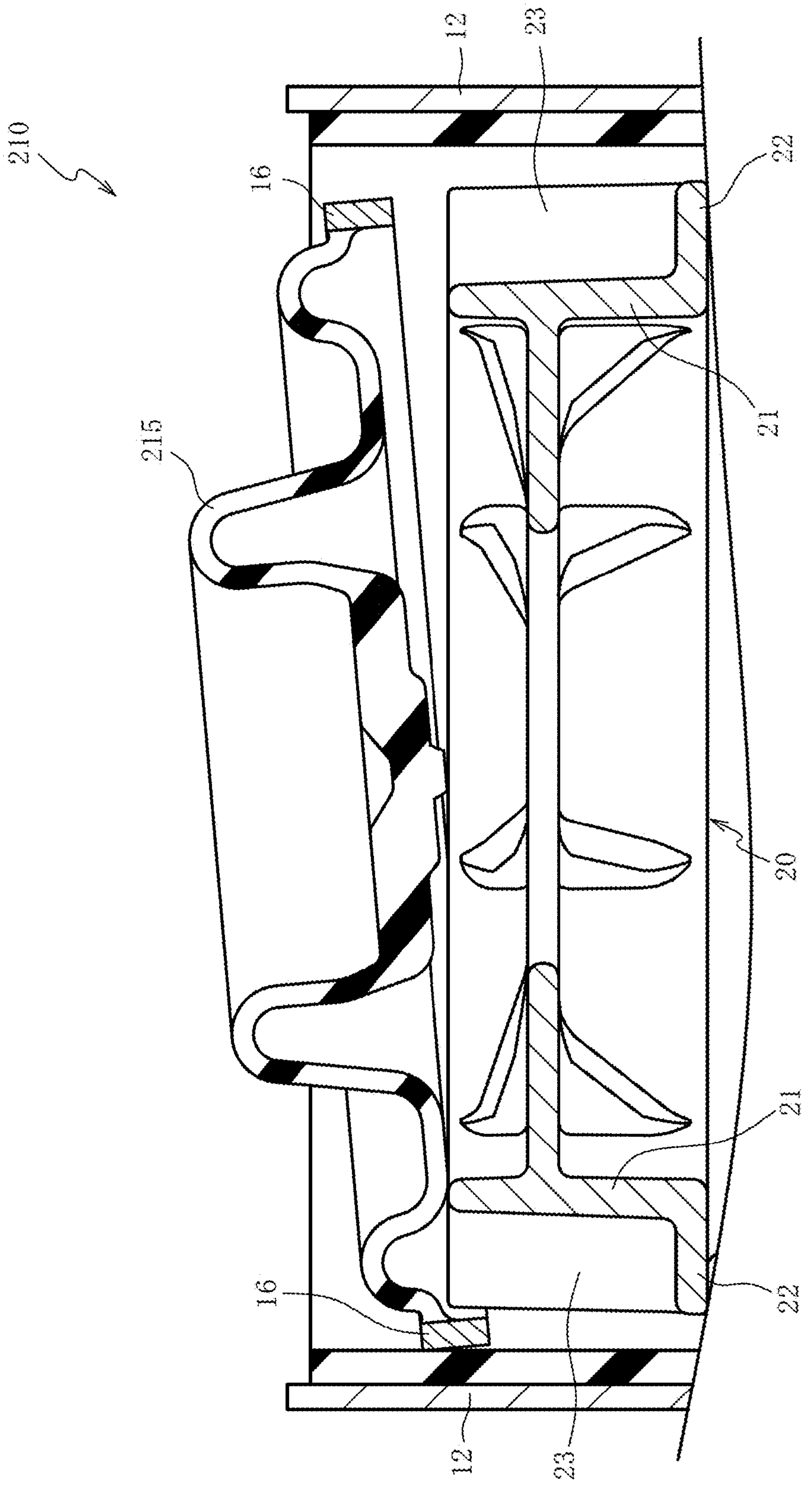
FIG. 4 Cross-sectional view of a liquid seal type vibration isolation device as a reference example.

Next, a molding method for a molded product including the diaphragm 15 and the annular member 16 will be described with reference to FIGS. 3A and 3B. FIG. 3A is a partially enlarged cross-cross-sectional view of the diaphragm 15 and the annular member 16 in a IIIa portion in FIG. 2B, and FIG. 3B is a partially enlarged cross-cross-sectional view of a lower mold 30 and an upper mold 40 for vulcanizing the diaphragm 15. In FIG. 3A, a contact portion 15*al* of a modification is indicated by an alternate long and two short dashes line.

As shown in FIG. 3B, the molded product including the diaphragm 15 and the annular member 16 is molded with a vulcanizing mold using the lower mold 30 and the upper mold 40. The lower mold 30 is a mold for forming the outer shape of a portion on one side (lower side in FIG. 3A) in the axial direction of the diaphragm 15. First grooves 31, 41 for holding the annular member 16 therebetween are respectively formed in the lower mold 30 and the upper mold 40, and the first grooves 31, 41 are annular recesses that face each other in the up-down direction at the time of mold clamping. A second groove 32 is formed on an inner circumference side (left side in FIG. 3B) of the first groove 31 of the lower mold 30. The second groove 32 is an annular recess for forming the contact portion 15*a* of the diaphragm 15.

A protrusion 33 protruding upward is formed between the grooves 31, 32 of the lower mold 30. The protrusion 33 is formed in a protruding shape forming an inner wall of the first groove 31 and an outer wall of the second groove 32 (in other words, rising from each of an inner edge of the first groove 31 and an outer edge of the second groove 32), and an inner circumference side of the annular member 16 is sealed with the protrusion 33 at the time of mold clamping. The inner circumference side of the annular member 16 is sealed with the protrusion 33, whereby a rubber material injected into a cavity C between the lower mold 30 and the upper mold 40 can be inhibited from entering between the axial end surface of the annular member 16 and the first groove 31.

The inner circumference side of the annular member 16 is sealed with the protrusion 33, whereby a groove-shaped recess 15*b* continuous in the circumferential direction is formed between the annular member 16 and the contact portion 15*a* of the diaphragm 15. In other words, such a recess 15*b* is formed between the contact portion 15*a* and the annular member 16, whereby the inner circumference side of the annular member 16 can be sealed with the protrusion 33 of the lower mold 30 as described above. Thus, the rubber material can be inhibited from entering between the annular member 16 and the first groove 31 of the lower mold 30. A recess 15*c* is also formed in an outer edge portion on the other side (upper side in FIG. 3A) in the axial direction of the diaphragm 15. The recess 15*c* is an annular recess continuous with the inner circumferential surface of the annular member 16, and is formed in a symmetric shape with respect to the recess 15*b* with a flat surface orthogonal to an axis of the annular member 16 being a plane of symmetry.

Here, as shown in FIG. 1, after the annular member 16 is stacked on the partition 20 and the diameter reduction processing is performed on the second fixture 12, an axial end portion of the second fixture 12 is caulked to the inner circumference side, thereby forming a caulking part 12*d*. At the time of this caulking, the annular member 16 is pushed onto the partition 20 side by the caulking part 12*d* (seal wall portion 14) of the second fixture 12. In this case, when the contact portion 15*a* protrudes to the partition 20 (wall portions 23) side relative to the axial end surface of the annular member 16 as in the present embodiment, the contact portion 15*a* is pressed onto the wall portions 23 side when the caulking part 12*d* is caulked.

Thus, for example, as indicated by an alternate long and two short dashes line in FIG. 3A, if the amount of a portion, protruding relative to the axial end surface of the annular member 16, of the contact portion 15*al* is large and the recess 15*b* is omitted, stress accompanying deformation of the contact portion 15*a*1 is easily concentrated in a joint portion between the diaphragm 15 and the annular member 16, when the contact portion 15*al* is pressed onto the wall portions 23 at the time of the above-described caulking.

On the other hand, in the present embodiment, the amount of a portion, protruding relative to the axial end surface of the annular member 16, of the contact portion 15*a* is slight (e.g., not more than 10% of the axial dimension of the annular member 16), and the recess 15*b* continuous in the circumferential direction is formed between the contact portion 15*a* and the annular member 16. Accordingly, the amount that the contact portion 15*a* is deformed when the contact portion 15*a* is pressed onto the wall portions 23 at the time of the above-described caulking can be made small, and part of such deformation can be received by the recess 15*b*. Accordingly, stress can be inhibited from being concentrated in the joint portion between the diaphragm 15 and the annular member 16, and thus the durability of the diaphragm 15 can be improved.

In addition, in a cross section including the axial center of the annular member 16, the contact portion 15*a* is formed in an arc shape protruding to the wall portions 23 side, and an outer edge of the arc shaped contact portion 15*a* is continuous with the arc-shaped recess 15*b*. A protruding and recessed part composed of the contact portion 15*a* and the recess 15*b* is formed so as to have a smooth curved surface, whereby stress can be inhibited from being concentrated in a part of the protruding and recessed part when the contact portion 15*a* is pressed onto the wall portions 23. Thus, the durability of the diaphragm 15 can be improved.

Although the present invention has been described based on the above embodiment, the present invention is not limited to the above embodiment at all. It can be easily understood that various modifications and improvements may be made without departing from the gist of the present invention.

In the above embodiment, the case where the contact portion 15*a* is formed continuously in the circumferential direction, has been described. However, the present invention is not necessarily limited thereto. For example, the contact portion 15*a* may be formed intermittently in the circumferential direction. A configuration in which the contact portion 15*a* is formed intermittently in the circumferential direction means that recesses are formed between the plurality of contact portions 15*a* arranged in the circumferential direction. In such a configuration, the contact portions 15*a* may be brought into contact with the wall portions 23, or the wall portions 23 may be fitted into the recesses (formed in positions corresponding to the plurality of wall portions 23) formed between the contact portions 15*a*, respectively. The wall portions 23 are fitted into the recesses between the contact portions 15*a*, respectively, whereby positioning of the diaphragm 15 in the circumferential direction can be performed.

In the above embodiment, the case where the contact portion 15*a* is a protrusion protruding to the partition 20 (wall portions 23) side relative to the annular member 16, has been described. However, the present invention is not necessarily limited thereto. For example, the axial end surface (end surface on the partition 20 side) of the annular member 16 and the contact portion 15*a* may be formed flush with each other. In addition, as long as the diaphragm 15 can be appropriately assembled (excessive inclination of annular member 16 can be regulated), the contact portion 15*a* may not necessarily protrude relative to the axial end surface of the annular member 16 (the contact portion 15*a* may be formed so as to be slightly lower than the axial end surface of the annular member 16).

In the above embodiment, the case has been described where the recess 15*b* continuous in the circumferential direction is formed between the contact portion 15*a* and the annular member 16. However, the present invention is not necessarily limited thereto. For example, the recess 15*b* may be formed intermittently in the circumferential direction, or as indicated by an alternate long and two short dashes line in FIG. 3A, the contact portion 15*al* having such a shape that the recess 15*b* is filled may be formed (the recess 15*b* may be omitted) in the diaphragm 15.

DESCRIPTION OF REFERENCE NUMERALS

10 liquid seal type vibration isolation device
11 first fixture (first member)
12 second fixture (second member)
13 vibration-isolating base body
15 diaphragm
15*a* contact portion
15*b* recess
16 annular member
17 first liquid chamber
18 second liquid chamber
20 partition
23 wall portions

The invention claimed is:

1. A liquid seal type vibration isolation device comprising: a first member and a tubular second member; a vibration-isolating base body which is made of a rubbery elastic body and connects the first member and the second member; a diaphragm which forms a liquid chamber, in which liquid is sealed, between the diaphragm and the vibration-isolating base body; an annular member, is fixed to an outer edge of the diaphragm, and is held on an inner circumference side of the second member; and a partition which partitions the liquid chamber into a first liquid chamber on the vibration-isolating base body side and a second liquid chamber on the diaphragm side, wherein the partition is formed in a plate shape extending in a radial direction, and includes a tube portion extending in an axial direction from the plate shape and a plurality of wall portions arranged in a circumferential direction, each of the wall portions extending in the radial direction from an outer circumferential surface of the tube portion, with an outer diameter of the partition being a diameter of a circle including outer edges of the wall portions in the radial direction, an inner diameter of the annular member is smaller than the outer diameter of the partition, the annular member is formed to have a thickness in the radial direction thinner than that in the axial direction, and the diaphragm includes a contact portion, and the contact portion extends in the axial direction and has an axial end that comes into contact with axial ends of the wall portions on an inner circumference side of the annular member, to regulate an inclination of the annular member to the partition.

2. The liquid seal type vibration isolation device according to claim 1, wherein the contact portion is formed continuously in the circumferential direction.

3. The liquid seal type vibration isolation device according to claim 1, wherein the contact portion is a protrusion protruding in the axial direction toward the partition side relative to an axial end surface of the annular member.

4. The liquid seal type vibration isolation device according to claim 3, wherein the diaphragm includes a groove-shaped recess which is formed between the annular member and the contact portion and is continuous in the circumferential direction, the recess being recessed in the axial direction opposite to a direction of the protruding of the protrusion of the contact portion.

5. The liquid seal type vibration isolation device according to claim 4, wherein an axial end portion of the second member is caulked to the inner circumference side.

6. The liquid seal type vibration isolation device according to claim 5, wherein when viewed from a cross section including an axis of the annular member, the contact portion is formed in an arc shape, and the recess is formed in an arc shape while being continuous with an outer edge of the contact portion.

7. The liquid seal type vibration isolation device according to claim 5, wherein a dimension of a portion of the contact portion is not more than 10% of a dimension in the axial direction of the annular member.

8. The liquid seal type vibration isolation device according to claim 1, wherein the wall portions are arranged at unequal intervals in the circumferential direction of the partition.

9. A method for manufacturing a liquid seal type vibration isolation device including: a first member and a tubular second member; a vibration-isolating base body which is made of a rubbery elastic body and connects the first member and the second member; a diaphragm which forms a liquid chamber, in which liquid is sealed, between the diaphragm and the vibration-isolating base body; an annular member, is fixed to an outer edge of the diaphragm, and is held on an inner circumference side of the second member; and a partition which partitions the liquid chamber into a first liquid chamber on the vibration-isolating base body side and a second liquid chamber on the diaphragm side, in which the partition is formed in a plate shape extending in a radial direction, and includes a tube portion extending in an axial direction from the plate shape and a plurality of wall portions arranged in a circumferential direction, each of the wall portions extending in the radial direction from an outer circumferential surface of the tube portion, with an outer diameter of the partition being a diameter of a circle including outer edges of the wall portions in the radial direction, an inner diameter of the annular member is smaller than the outer diameter of the partition, the annular member is formed to have a thickness in the radial direction thinner than that in the axial direction, and the diaphragm includes a contact portion extending in the axial direction and having an axial end that comes into contact with axial ends of the wall portions on an inner circumference side of the annular member, the method comprising:

a first step of stacking the annular member on the plurality of wall portions; and a second step of reducing a diameter of the second member after the first step, wherein in the first step, if the annular member is shifted in the radial direction until the annular member comes into contact with an inner circumferential surface of the second member the diameter of which has not been reduced, the axial end of the contact portion is brought into contact with the axial end surfaces of the wall portions, to regulate an inclination of the annular member to the partition.

* * * * *